Nov. 12, 1957 W. NICHOLAS 2,813,054
METHOD OF SEAMING PROJECTION SCREEN MATERIAL
Filed March 1, 1954 2 Sheets-Sheet 2

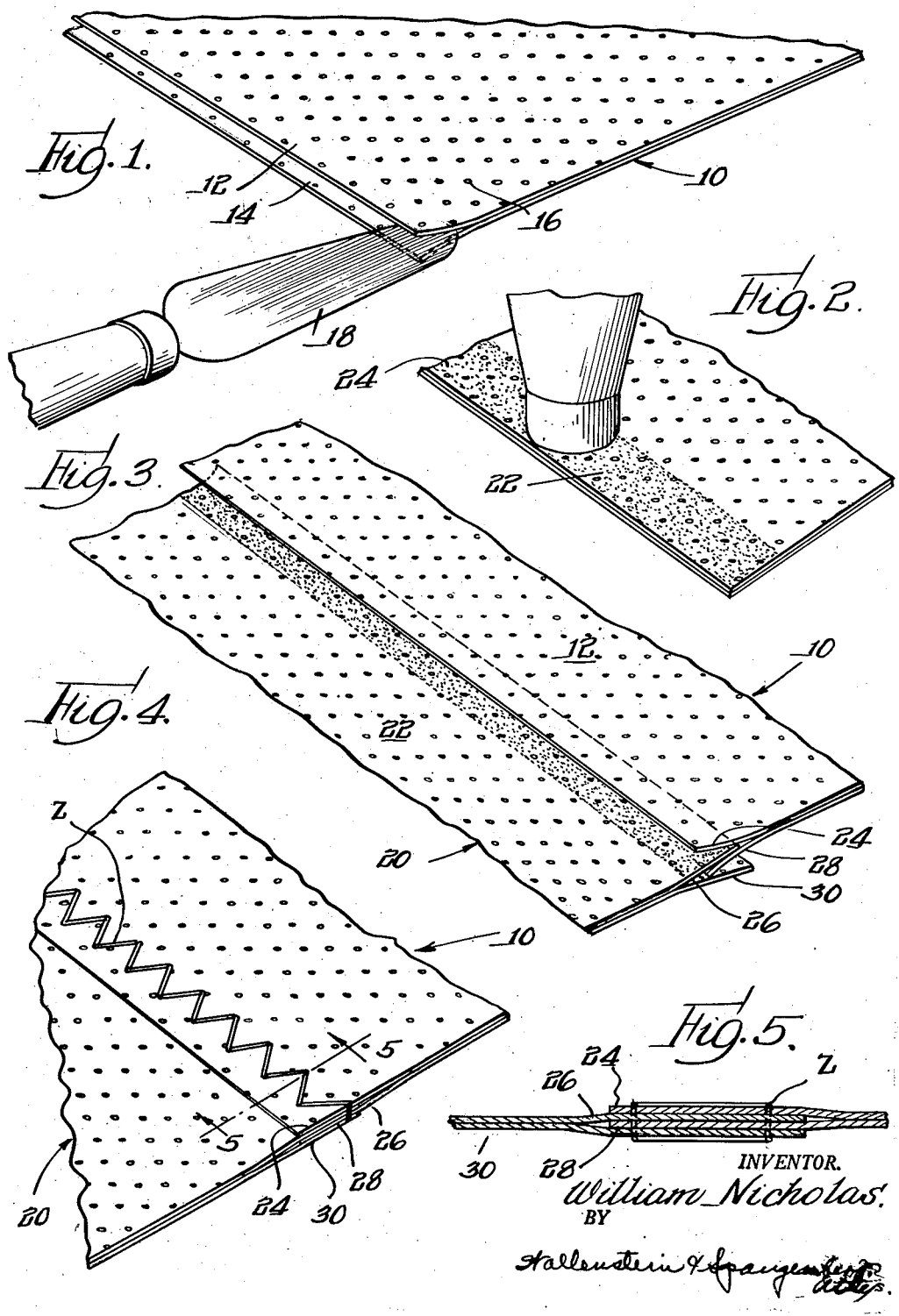

INVENTOR.
William Nicholas
BY
Hallenstein & Spangenberg
Attys.

United States Patent Office 2,813,054
Patented Nov. 12, 1957

2,813,054

METHOD OF SEAMING PROJECTION SCREEN MATERIAL

William Nicholas, Evanston, Ill.

Application March 1, 1954, Serial No. 413,278

4 Claims. (Cl. 154—116.5)

My invention relates to the seaming of picture projection screen fabrics and is more particularly concerned with the seaming of widths of raw screening fabrics, of the type which comprises a somewhat rigid material but which is adapted to be rolled up on a screen roll, whereby to produce picture projection screens of sufficient width so as to adapt them for use in exhibition halls, commercial theaters and for like or related purposes whereby large screens are required.

In order to provide picture projection screens of adequate width for use in theaters and the like, it has long been common practice to seam together the projection screen fabrics and this has heretofore commonly been done by abutting together the widths of screen material and gluing or sealing on the back side of the abutment, in overlapping relation to the seam, a strip of webbing or plastic material or the like. This type of procedure frequently resulted in causing "laddering" and "bellying out" of the screen fabric material due to improper registration of the widths of raw screening. Furthermore, the crack between the abutting edges not infrequently stretched out when the screen was put to continued use and appeared as a black line on the projected image. Moreover, due to the differences in composition and structure between the strip of webbing or plastic material and the screen fabric, the different materials underwent different rates of stress when the finished projection screen was hung for use so that the set in said strip caused "bellying" of the finished projection screen.

It was also recognized that, when such seamed commercial picture projection screens were hung in vertical position for the projection of pictures or the like thereon, discrepancies in the seaming which might otherwise not be noticeable became quite apparent. Thus, for instance, inaccuracies in the proper registration of the widths of screen fabrics seamed together, even where the error in registration was of the order of a few thousandths of an inch, frequently resulted in distorted projected pictures. The seaming difficulties and problems were enhanced in the case of picture projection screens which were adapted for use with loud speakers for sound reproduction. Such latter screens are perforated with generally uniformly spaced small holes, commonly about ¼ inch apart from each other, to allow the sound readily to pass through the screens.

My invention brings about definite improvements in the seaming of projection screen fabrics of the type described above, for use in making large screens, for example, from 10 to 40 feet in width, and is adapted for use in the seaming of various types of projection screen fabrics such as webbed materials, aluminum corrugated and coated fabric sheets, vinyl impregnated cloth, and laminated sheets, with or without perforations therein. The invention is easily and simply carried out and "laddering" and "bellying out" tendencies are largely minimized.

In accordance with my invention, in its broader aspects, two individual rolls of the screen fabric to be seamed are supported respectively on laterally spaced flexible longitudinal supporting surfaces, the free ends of the screen fabric of each roll being overlapped along their lengths. Movement of the rolls on their supporting surfaces is effected slowly, relative to a sewing mechanism, in a direction lengthwise of the longitudinal axes of said rolls whereby the screen fabrics are seamed together, the system, and particularly the longitudinal supporting surfaces, being arranged to permit vibration or oscillation of the screen rolls in sympathy with the stitching motion of the sewing mechanism. More detailed procedures and alternative techniques will be described below in conjunction with the attached drawings which illustrate method details and equipment suitable for effective practice of the invention.

Fig. 1 is a perspective view showing an edge of a portion of a width of a double-ply sheet of a projection screen material, said sheet comprising a metallized or metallic light-reflecting surface and a backing fabric laminated thereto, said sheet having spaced perforations extending therethrough, and illustrating the delamination of said sheet preparatory to carrying out one embodiment of my seaming method;

Fig. 2 is a view showing the application of a light absorbent coating material along an edge of the top or light-reflecting surface of the projection screen material;

Fig. 3 is a perspective view showing the mating or interleaving arrangement of the delaminated edges of the sheets of projection screen material to be seamed;

Fig. 4 is a top perspective view showing the seamed sheets of projection screen material with a zig-zag line of stitching extending therethrough;

Fig. 5 is a section taken along the line 5—5 of Fig. 4;

Figure 6:
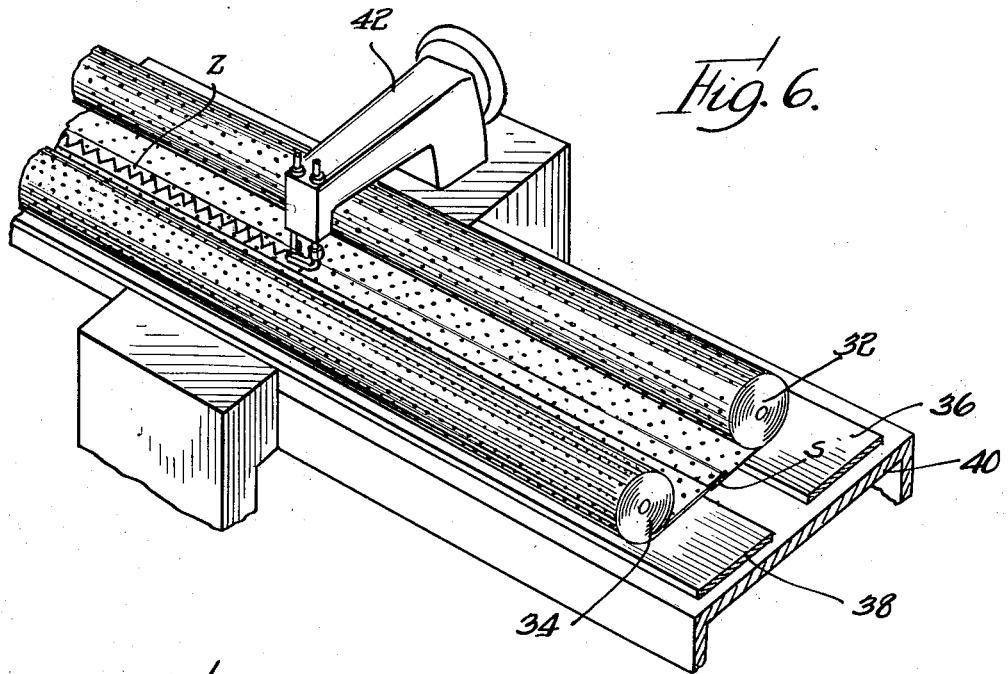
Fig. 6 is a perspective view of illustrative apparatus or equipment for use in carrying out the seaming method of my invention.

In accordance with one embodiment of my invention, a projection screen material 10, in the form of a laminated sheet comprising a metallic light-reflecting sheet 12 and a backing fabric 14, said laminated sheet having perforations or apertures 16 extending therethrough, is delaminated along a free edge thereof by wetting down the backing fabric 14 with a suitable organic solvent to a width corresponding to the width of the delamination desired, for instance, ½ to about 1½ inches, followed by prying apart the sheet 12 and backing 14 by means of the tool 18 and sliding said tool along the entire length of the free edge. The mating laminated material 20, which is to be seamed to the material 10, is delaminated in like fashion.

A light absorbent material, such as black paint or India ink, is painted or coated on the light-reflecting surface 22 of the sheet 20 to a width sufficient to cover the width of the seam, as shown at 26. By so proceeding, it is unnecessary that the perforations in the overlapping portions 24 and 26 overlie each other precisely, and the result is, therefore, that the reflected light over the seamed screen as a whole will not vary or vary to any noticeable degree over its entire area. The delaminated portions are then interleaved whereby the portion 24 directly overlies the coated portion 26, and with the delaminated backing portions 28, 30 overlying each other therebelow, as is clearly shown in Figs. 3, 4 and 5. Glue or other adhesive is then applied between the several overlapping portions and said portions are pressed down to lie flat until the glue or adhesive is thoroughly dried. The resulting screen fabric is then rolled up carefully parallel to the seam and, if desired, the rolls can be stored until ready for the stitching operation.

Figure 7:
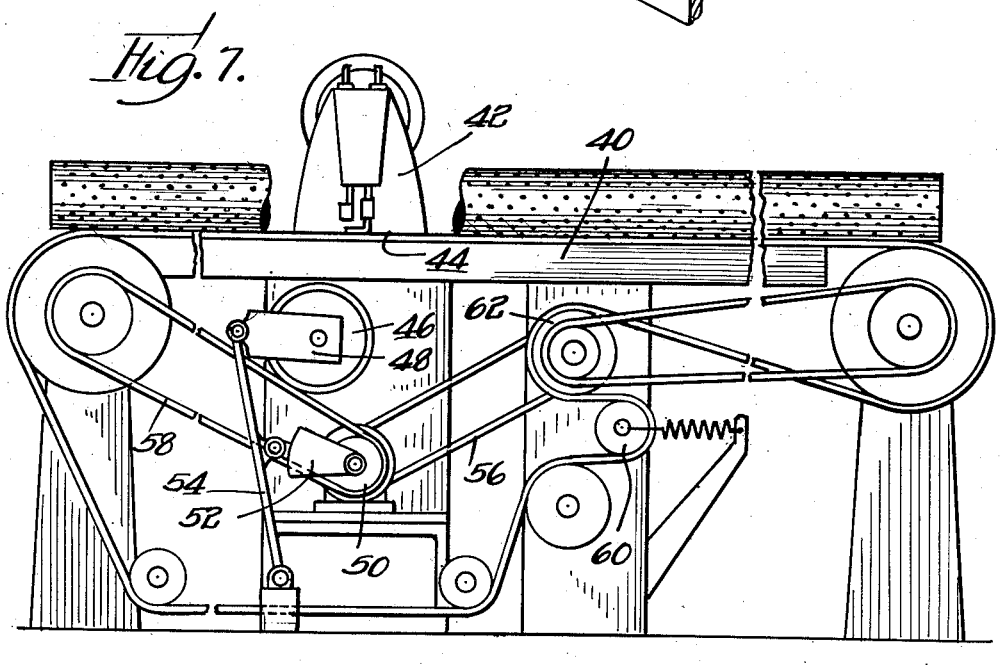
Fig. 7 is a side elevation of the apparatus or equipment of Fig. 6.

Referring, now, to Figs. 6 and 7, the rolls 32 and 34, bearing the projection screen fabric which has been adhesively seamed at S, in the manner described above, are supported on longitudinal supporting surfaces, particularly spaced flexible endless belts 36, 38, which may be made of fabric or rubberized fabric or the like, suitably supported on a table 40 for movement in a direction lengthwise of their longitudinal axes past a stationary sewing mechanism 42. The length of said belts should be quite substantial and, depending upon the width of the screen fabrics, may be as long as several hundred feet, even though the width of the screen fabric is only 10 to 20 feet. The screen rolls 32 and 34 should be handled carefully to avoid buckling or denting of the screen surface and care should be exercised in laying said rolls on their respective belts. The belts 36 and 38 are slowly moved continuously, in a plane past the sewing machine base 44, so that the screen rolls move through the sewing mechanism at a speed usually of about 1 to about 3 feet per minute although this speed is somewhat variable, but in all cases it is relatively slow, generally in the range of about 1 to about 8 feet per minute. The zig-zag type of stitch, shown at Z (Fig. 4) is particularly preferred, but other types of stitches can, broadly, be utilized. The foot and claw clamping motion of the sewing mechanism, operating in the arrangement of the screen roll supporting belts described above, causes the screen cloth supporting rolls to vibrate or oscillate in sympathy with the stitching motion due to the flexibility in the belts. In other words, the arrangement of the supporting surfaces or belts 36, 38 permits limited vibration or oscillation of the screen rolls 32 and 34, generally longitudinally of their axes, in sympathy with the stitching motion of the sewing mechanism. This represents an important feature of my present invention.

As shown in Fig. 7, the sewing machine is driven by motor 46 and the speed of said sewing machine is controlled by means of lever 48 in conventional manner. The belts 36, 38 are driven by the belt drive motor 50, the speed of which is regulated, in conventional manner, by means of control lever 52, operating in fashion similar to that of lever 48. Levers 48 and 52 are simultaneously actuated by foot controlled rod 54. The belt drive motor 50 drives the belts 36, 38 at relatively constant speed, for the particular setting selected, by drive chains 56, 58. Any excess slack in the belts 36, 38 is taken up by the spring loaded tension wheel 60, which also serves to bring about movement of the belts 36, 38 in the proper direction by curving the belt around the belt drive roll 62, thereby increasing frictional contact of the belts with the drive roll 62.

While, in connection with Figs. 1 to 5, inclusive, I have described a procedure which involves the utilization of light absorbent materials in conjunction with a delaminating and interleaving technique, it is to be understood that my invention, in certain of its aspects, encompasses procedures wherein the widths of projection screen fabrics are joined together by simple overlapping of the free ends of the screens along their lengths, supporting the individual rolls on longitudinal surfaces, notably flexible belts, and effecting movement of said rolls in a direction lengthwise of their longitudinal axes relative to a sewing mechanism whereby the screens are seamed together, the longitudinal supporting surfaces being arranged to permit limited oscillation of the screen rolls in sympathy with the stitching motion of the sewing mechanism.

After the stitching operation has been carried out, as described above, additional stitching, for example, by a straight stitch adjacent the zig-zag stitch, can, if desired, be utilized and this is accomplished in the same general manner as the original stitching. The finished screen is then rolled up on one or more rolls for shipment or delivery to its place of installation.

What is claimed as new and desired to protect by Letters Patent of the United States is:

1. In a method of seaming projection screens of the type which comprise a somewhat rigid material but which is adapted to be rolled up on a screen roll and which is further characterized by having a backing fabric laminated to the reverse side of the light projection surface and having spaced perforations extending through the body of said screen, the steps which comprise delaminating the free edges, in each of two separate rolls of screen, of the projection screen surface material and its backing fabric all along their lengths and to a narrow width, coating an edge of the light reflecting surface of the lower of the delaminated parts of said projection screen material with a light absorbent material, interleaving the delaminated portions whereby the said projection screen surfaces directly overlie each other with the coated edge on the underside, and whereby the delaminated backing materials overlie each other therebelow, adhesively joining together the resulting interleaved delaminated portions, then placing each of the said two rolls of screen materials upon a longitudinal supporting surface, and effecting movement of said rolls on said longitudinal supporting surfaces, while allowing limited oscillation of said rolls, in a direction lengthwise of their longitudinal axes relative to a sewing mechanism whereby a line of stitching is placed in said interleaved portion, said limited longitudinal oscillation of the screen rolls being in sympathy with the stitching motion of said sewing mechanism.

2. In a method of seaming projection screens of the type which comprise a somewhat rigid material but which is adapted to be rolled up on a screen roll and which is further characterized by having a backing fabric laminated to the reverse side of the light projection surface and having spaced perforations extending through the body of said screen, the steps which comprise delaminating the free edges, in each of two separate rolls of screen, of the projection screen surface material and its backing fabric all along their lengths and to a narrow width, coating an edge of the light reflecting surface of the lower of the delaminated parts of said projection screen material with a light absorbent material, interleaving the delaminated portions whereby the said projection screen surfaces directly overlie each other with the coated edge on the underside, and whereby the delaminated backing materials overlie each other therebelow, adhesively joining together the resulting interleaved delaminated portions, then placing each of the said two rolls of screen materials upon a flexible longitudinal supporting surface, said supporting surfaces being laterally spaced from each other, the aforesaid interleaved portion being disposed between said supporting surfaces, and slowly moving said rolls on said flexible longitudinal supporting surfaces, while allowing limited oscillation of said rolls, in a direction lengthwise of their longitudinal axes past a stationary sewing mechanism whereby a line of stitching is placed in said interleaved portion, said limited oscillation of the screen rolls being in sympathy with the stitching motion of said sewing mechanism.

3. In a method of seaming theater projection screens of the type which comprise a somewhat rigid material but which is adapted to be rolled up on a screen roll and which is further characterized by having a backing fabric laminated to the reverse side of the light projection surface and having spaced perforations extending through the body of said screen, the steps which comprise delaminating the free edges, in each of two separate rolls of screen, of the projection screen surface material and its backing fabric all along their lengths and to a narrow width, coating an edge of one of the delaminated parts of said projection screen material with a light absorbent material, interleaving the delaminated portions whereby the said projection screen surfaces directly overlie each other with the coated edge on the underside, and whereby the delaminated backing materials overlie each other therebelow, and adhesively joining together the resulting interleaved delaminated portions.

4. In a method of seaming projection screens of the type which comprise a somewhat rigid material but which is adapted to be rolled up on a screen roll and which is further characterized by having a backing fabric laminated to the reverse side of the light projection surface and having spaced perforations extending through the body of said screen, the steps which comprise delaminating the free edges, in each of two separate rolls of screen, of the projection screen surface material and its backing fabric all along their lengths and to a narrow width, coating an edge of one of the delaminated parts of said projection screen material with a light absorbent material, interleaving the delaminated portions whereby the said projection screen surfaces directly overlie each other with the coated edge on the underside, and whereby the delaminated backing materials overlie each other therebelow, adhesively joining together the resulting interleaved delaminated portions, and then sewing a line of stitches through said interleaved portion.

References Cited in the file of this patent

UNITED STATES PATENTS

| | | |
|---|---|---|
| 1,460,891 | De Voe | July 3, 1923 |
| 1,623,075 | Thomas | Apr. 5, 1927 |
| 2,366,710 | Dimond | Jan. 9, 1945 |
| 2,424,777 | Stuart | July 29, 1947 |
| 2,683,679 | Hurd et al. | July 13, 1954 |

FOREIGN PATENTS

| | | |
|---|---|---|
| 641,576 | Great Britain | Aug. 16, 1950 |